United States Patent [19]

Williams

[11] 4,143,289

[45] Mar. 6, 1979

[54] ROTATIONAL FIELD SENSOR

[75] Inventor: Don W. Williams, Van Wert, Ohio

[73] Assignee: Progressive Electronics, Inc., Fort Wayne, Ind.

[21] Appl. No.: 750,529

[22] Filed: Dec. 14, 1976

[51] Int. Cl.² .............................................. H02A 21/14
[52] U.S. Cl. ...................................... 310/156; 310/168
[58] Field of Search ............... 310/155, 152, 168, 111, 310/156, 68 R, 68 A–D

[56] References Cited
U.S. PATENT DOCUMENTS

| 697,963 | 4/1902 | Apple | 310/152 |
|---|---|---|---|
| 2,820,915 | 1/1958 | Mathews | 310/161 |
| 2,947,168 | 8/1960 | Yang | 310/111 X |
| 3,867,657 | 2/1975 | Yates et al. | 310/68 D |
| 3,906,267 | 9/1975 | Coupin et al. | 310/68 R |

Primary Examiner—Donovan F. Duggan

[57] ABSTRACT

A rotational field, such as is produced by the rotation of a motor vehicle alternator rotor, has placed therein a conductor coil which is cut by the lines of force, or flux lines, of the rotating field. The coil is wound upon a magnetic strip which in turn is wrapped around the housing of the alternator. The rotational speed of the alternator rotor will cause corresponding pulses in the coil which are received by a circuit which utilizes the pulse rate to control an output.

8 Claims, 7 Drawing Figures

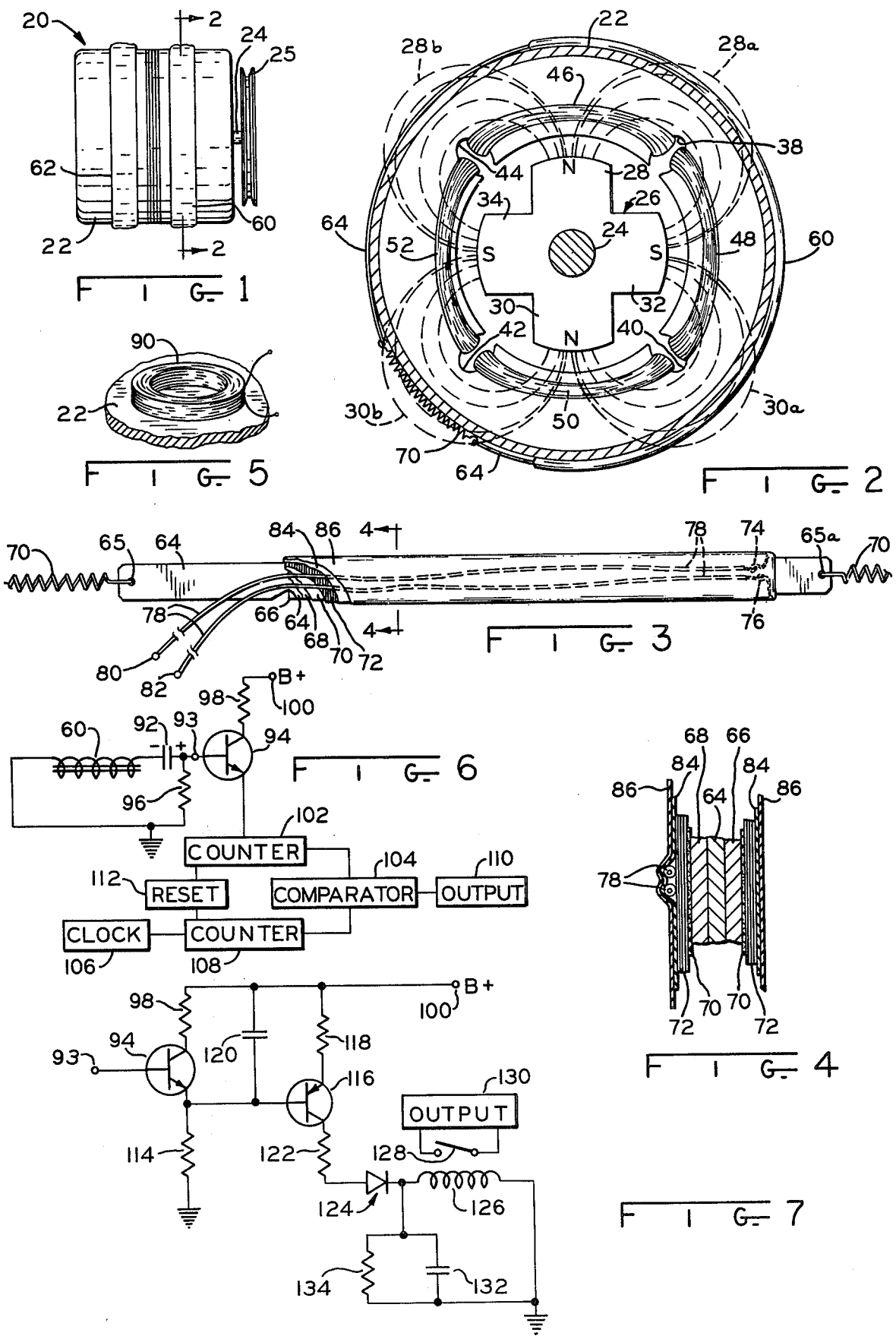

ROTATIONAL FIELD SENSOR

BACKGROUND OF THE INVENTION

1. Field of the Invention

This invention is in the field of moving field sensors, and more particularly to a sensor having an output responsive to the rotative speed of a field corresponding to vehicle engine speed.

2. Brief Statement of the Prior Art

For numerous purposes, it is required to know the rotating speed of a motor vehicle engine and to obtain an output during certain engine rotational speeds and speed ranges. Usually, the manner in which such speed is obtained is to mechanically gear a rotatable cable to a rotating engine part and then utilize the rotational speed of the cable for control purposes. This, of course, required the gearing to the rotatable engine part and the mechanical coupling of that gearing to a rotatable cable, all of which is of considerable expense. Further, the cable use was limited due to relatively low cable flexibility, required clearance for cable routing, and frequent cable maintenance and lubrication. These disadvantages are well known to the art and to the operators of motor vehicles.

SUMMARY OF THE INVENTION

A motor vehicle alternator conventionally has a rotor and a stator, with the rotor comprised of a number of magnetic poles which establish a magnetic field. The rotor ordinarily is mounted for rotation centrally of the alternator with the stator being concentric with the rotor axis and being radially outwardly spaced from the rotor. The stator is generally comprised of a number of windings of conductive wire in radial stator slots. In a number of alternator designs, the stator is located centrally of the alternator while the rotor which carries the magnetic poles is a ring which is rotatably mounted concentrically with the stator axis. In both alternator designs, the magnetic field created by the rotor magnetic poles rotates with the rotor and has lines of force, or flux lines, which cut the stator windings to generate an E.M.F. for use in the motor vehicle electrical system. These flux lines are also present exteriorly of the alternator housing and are utilized by this invention.

The magnetic strips have a coil winding with a very large number of turns of an enameled conductor. A pair of elongate magnetic strips supported on either side of an elongate steel band. The band is wrapped exteriorly of the alternator housing and is tensilely held thereagainst, as with a drawspring applied between the band ends. The magnetic strips are supported on either side of the supporting band by an insulating tape having adhesive surfaces on both sides thereof. The magnetic strip length is preferably equal to the circumferential length of the arc spanning an odd number of magnetic poles on the rotor. An enameled wire is wound many turns, in the order of 12,000 in one embodiment, on the insulative adhasive tape with the wire being wound back upon itself a number of times so that the wire ends are at the same end of the magnetic strips. Insulated wires are then soldered, or otherwise attached, to the ends of the enameled wire. The insulated wires are of a length sufficient to connect to a pulse sensing circuit which can sense the pulse rate caused by the magnetic pole flux cutting the coil windings to thus determine the rotative speed of the alternator. Insulative electrical tape is then applied around the coil windings and the insulated wire, which is laid longitudinally therealong. By taping the insulated wire to the length of windings, the soldered connection between the coil ends and the insulated wire is protected. This is important since the coil windings are made of a relatively fine wire, in the order of A.W.G. No. 34, 38, while the insulated wire is relatively large and the soldered connection therebetween is fragile. A waterproof plastic cover is then applied over the electrical tape to complete the sensor fabrication. If desired, two identical sensors may be placed side by side on the alternator and identically positioned relative the magnetic poles in the rotor and series connected so that reinforcing pulses are provided.

With the construction of this invention, engine rotative speed may be accurately obtained by a relatively simple add-on component which requires no mechanical gearing and is relatively inexpensive. The only attachment to an engine component that is necessary is to place the sensor band around the alternator and connect a spring between the band ends to hold it firmly against the alternator. Relatively small, flexible electrical wires are then routed to a pulse rate sensing circuit and a desired output means which may be conveniently located at any desired vehicle position since the wire length and flexibility may be readily adapted to any required routing. The wire ends may be provided with terminals which can be readily attached to a vehicle terminal board on the engine side of the vehicle fire wall with a complementary board having terminals for the pulse rate sensing circuit being on the vehicle interior side of the fire wall.

Therefore, it is an object of this invention to provide a relatively simple, easily installed, rotating field sensor.

A further object of this invention is to provide such a sensor that is easily attached to a vehicle engine component to determine engine vehicle speed, with leads from the sensor being easily and readily routed to sensing and output circuitry located in the vehicle interior.

A further object of this invention is to provide in such a sensor a coil winding of many turns around a magnetic core which is adaptable for circumferential attachment to a vehicle alternator.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE DRAWINGS

FIG. 1 is a side elevational view of a conventional motor vehicle alternator shown diagrammatically, for the purpose of simplification, with a pair of sensors of this invention attached thereto;

FIG. 2 is a section taken at 2—2 of FIG. 1;

FIG. 3 is a top plan view, partially broken away, of a sensor of this invention;

FIG. 4 is a partial section taken at 4—4 of FIG. 3;

FIG. 5 is a partial diagrammatic perspective view of a second embodiment of this invention;

FIG. 6 is a partially schematic and partially block diagram of a pulse rate sensing circuit for use with the sensor of this invention; and FIG. 7 is a partial schematic diagram showing a second pulse rate sensing circuit for use with the sensor of this invention.

A DESCRIPTION OF A PREFERRED EMBODIMENT

Referring to the drawing, a motor vehicle alternator 20 of conventional design has a housing 22, which typically is made of aluminum, and in which is rotatably and centrally mounted a shaft 24. Typically, the shaft 24 is driven by a pulley 25 and a belt, not shown, from the engine crankshaft, not shown. A rotor 26 affixed to shaft 24 and has a permanent magnet with north poles 28, 30 and south poles 32, 34. Affixed to the inner surface of housing 22 is stator ring 36 which typically is of a laminated construction of magnetic material, such as soft iron, and has radial slots 38, 40, 42 and 44 formed therein. Wound in slots 38 to 44 in a conventional manner are stator windings 46, 48, 50 and 52. Also, as well known in the art, a magnetic field exists between the poles or rotor 26 and this field is diagrammatically shown by dashed flux lines 28a which are between poles 28 and 32, lines 28b which are between poles 28 and 34, lines 30a which are between poles 30 and 32, and lines 30b which are between poles 30 and 34. Poles 28, 30, 32, and 34 may also be electromagnets and the teachings of this invention are equally applicable to such a construction. As will become apparent, this invention is applicable to any device which has a rotating field. In a conventional manner, as rotor 26 is driven by shaft 24, flux lines 28a, 28b, 30a, and 30b, are caused to cut the windings 46, 48, 50, and 52 to generate therein an E.M.F. which is utilized in the motor vehicle electrical system.

Circumferentially wrapped around alternator 22 is a sensor circuit 60. If desired, a sensor 62, which is identical to sensor 60 and axially spaced therefrom, is positioned on housing 22 circumferentially identically to sensor 60. In the following description, only sensor 60 will be described but it is understood that sensor 62 is of identical construction and as many sensors as desired may be used. By connecting the sensors in series, an amplified pulse is obtainable.

Sensor 60, FIGS. 3 and 4, has an elongate metallic band 64 which may be of a flexible steel material, having holes 65, 65a, at the ends thereof for receiving, respectively, the ends of a drawspring 70. Placed on either side of band 64 and positioned intermediately thereof, are elongate magnetic strips 66, 68 which are of a magnetic material, such as soft iron, and which may be 20 mils thick, ⅛ inch wide, and 10 inches long. Strips 66, 68 are secured to band 64 by wrapping a tape 70 therearound, tape 70 having an adhesive surface on both sides thereof. An enameled magnet wire 72, which may be wire size A.W.G. #38, has end terminals 74, 76. Coil 72 may have a resistance in the range of 100 to 200 ohms, and preferably is 180 ohms for alternator use. Wire 72 is wound around tape 70 and held in place thereby to form a coil winding having a large number of turns, which may be in the order of 12,000, and is wound back and forth upon itself with ends 74 and 76 being at the same end of strips 66 and 68. Soldered, or otherwise attached, to terminals 74 and 76 are the terminals of an insulated wire 78 having terminals 80, 82 which is laid back longitudinally against winding 72. Electrical insulating tape 84 is then wound around coil winding 72 and wire 78 for the length of strips 66 and 68, thus securing winding 72 and wire 78 and protecting the soldered connections between terminal 74, 76, and wire 78, which connections are somewhat fragile due to the small wire size of winding 72. The size of wire 78 may be A.W.G. #6. A waterproof plastic coating 86 is then formed over tape 84 to minimize moisture and water penetration of the sensor 60.

The sensor 60 is then placed around armature housing 22 and drawspring 70 is attached to the ends thereof to tensilely hold sensor 60 to the outer circumference of housing 22. The length of sensor 60 is preferably equal to the circumferential arcuate length of housing 22 which spans an odd number of magnetic poles and, as shown in FIG. 2, is sufficient to span poles 28, 30, and 32. In this manner, a net magnetic pulse is assured for every rotation of rotor 26. It is noted that flux lines 28a, 28b, 30a, and 30b, extend beyond the outer circumference of housing 22 and cut the turns in coil winding 72 as rotor 26 turns.

Alternately, sensor 60 may comprise an air core coil 90, shown diagrammatically in FIG. 5, which may be of enameled A.W.G. #24 wire having a one and one-half inch inside diameter, having approximately 130 turns, and a 6 ohm resistance. The coil height can be ⅛ inch to ¼ inch and the coil 90 would be placed on the alternator with a coil end being laid on the alternator housing 22, as shown in FIG. 5, and may be attached as with epoxy or other adhesive, or banding.

Referring to FIG. 6, coil 60 is shown schematically and terminal 74 is connected to one plate of capacitor 92, the other plate of which is connected through terminal 93 to the base of NPN transistor 94 and to one side of a resistance 96. Terminal 76 is connected to the other side of resistance 96. The collector of transistor 94 is connected through a resistance 98 to a B+ voltage lead 100. The emitter of transistor 94 is connected to a counter 102 which has its output connected to a comparator 104. An adjustable clock pulse generator 106 generates a series of clock pulses which are transmitted to a counter 108, the output of which is also connected to comparator 104. The count from counters 102 and 108 are compared in comparator 104 and when the count from counter 102 exceeds the count from counter 108, comparator 104 generates an output circuit 110 which may sound an alarm or provide a control function to other circuitry as desired. By adjusting the clock rate from generator 106, output 110 may be energized at different pulse rates from sensor 60. Reset circuit 112 is connected between counters 102 and 108 and provides an automatic simultaneous periodic reset of counters 102 and 108. The reset wound normally occur before counters 102 and 108 reach their highest count capacity. The circuit of FIG. 6 is only illustrative of an application in which sensor 60 may be used. Counters 102, 108, comparator 104, clock 106, and reset 112 are all commercially available components which are known by and readily available to one skilled in the art.

In the operation of the disclosed embodiment, shaft 24 is rotated by the engine crankshaft through conventional belts and pulleys to rotate rotor 26. The flux lines from the rotating magnetic poles 28, 30, 32, and 34 cut the turns of coil winding 72 generating two pulses for each 360° rotation of rotor 26. The pulses are applied through capacitor 92 and resistor 96 to the base of transistor 94 causing it to go into conduction for each pulse occurrence. Amplified pulse signals are present at the emitter of transistor 94 and are applied to counter 102 which generates a count pulse corresponding to the number of pulses received. This count is applied to a first input of comparator 104. A clock 106 also generates a series of clock pulses at a uniform pulse rate, which pulses are applied to counter 108 which counts these pulses and applies a signal corresponding to the pulse count to comparator 104. The pulse rate from clock 106 is adjustable to suit particular applications. In comparator 104, the pulse count from counters 102 and 108 are compared and when the count from counter 102 exceeds the count from counter 108, an output is generated from comparator 104 to output 110 for control circuit function. Reset 112 automatically periodically resets counters 102 and 108, normally before they reach their count capacity. Thusly configured, the circuit of FIG. 6 will provide an output signal whenever the pulses generated by the rotation of rotor 26 exceeds the clock rate pulses from clock 106 over the reset period of reset 112. Other pulse sensing circuits known to the art may be utilized.

Referring to FIG. 7, a second circuit for utilizing the pulse information generated by sensor 60 is disclosed. In this circuit, transistor 94 which has its base connected to terminal 93 as shown in the circuit of FIG. 6, and its collector connected to B+ terminal 100 through resistance 98, has its emitter connected to ground through resistance 114. A PNP transistor 116 has its emitter connected through resistance 118 to terminal 100 and its base connected to the emitter of transistor 94. A capacitor 120 is connected between the base of transistor 116 and terminal 100. The collector of transistor 116 is connected through resistance 122 to the anode of diode 124 which has its cathode connected through relay coil 126 to ground. Relay switch 128 is in output circuit 130. In the operation of the circuit of FIG. 7, a pulse frequency of a given rate applied to the base of transistor 94 will cause corresponding intermittent conduction of transistor 94. When transistor 94 is conducting, a positive potential will be coupled to the base of transistor 116 causing it to be non-conductive. When transistor 94 is non-conductive, the base of transistor 116 will go to ground potential causing transistor 116 to conduct. When transistor 116 is conducting, diode 124 will conduct causing a current flow through coil 126. When the pulse rate to the base of transistor 94 is sufficiently high, current flow through diode 124 will be through capacitor 132 to ground, bypassing coil 126 so that switch 128 will remain open. However, when the sensor 60 pulse frequency drops below a predetermined minimum, sufficient current will flow through coil 126 to close switch 128 to energize output 130.

This invention has application to motors, generators, and any apparatus having a moving field. For example, permanent magnets may be mounted on a vehicle universal joint and the sensor of this invention may be affixed to the outer casing of the universal to sense rotative speed of the universal joint. In such usage, the coils would typically be quite short.

While there have been described above the principles of this invention in connection with specific apparatus, it is to be clearly understood that this description is made only by way of example and not as a limitation to the scope of the invention.

What is claimed is:

1. Apparatus for sensing the rotation of a rotating field comprising first means for sensing the rotation of the field of a plurality of arcuately spaced magnetic poles mounted for rotation about an axis and for producing a signal upon a predetermined rotational movement of said field;

second means for locating and supporting said first means in said field to provide relative movement between said first means and said field as said field rotates;

said first means comprises a coil having first and second terminals; said second means supporting said coil in said field so that said coil is traversed by said field as said field rotates thereby producing a signal at said terminals corresponding to traversal of said coil by said field;

said first means further comprises a magnetic strip; said coil being wound on said strip; said strip being flexible and formable in a curvilinear configuration; said second means supporting said strip with a radius of curvature substantially coaxial with said field axis and within said field.

2. The apparatus of claim 1 wherein said strip has an arcuate length equal to the arc spanning an odd number of said magnetic poles.

3. The apparatus of claim 1 wherein said second means comprises an elongate flexible supportive band; an elongate magnetic strip being affixed to either side of said band; said coil being wound around said strips and said band.

4. The apparatus of claim 3 wherein said magnetic poles are rotatable in a rigid housing; said band being formable about said housing; resilient means attachable to the band ends for firmly holding said band around said housing.

5. The apparatus of claim 3 wherein said second means further comprises an adhesive tape having an adhesive surface on each side thereof being wrapped over said magnetic strips and said band to hold said strips to said band; said coil being wound around said tape and adhered thereto.

6. The apparatus of claim 5 including insulated wire leads being conductively secured to said coil terminals; said leads being laid longitudinally along said coil exterior.

7. The apparatus of claim 6 including an insulative tape wound over said coil and said leads to firmly hold said leads to said coil; a moisture resistant covering being snugly fitted over said insulative tape; the free ends of said leads extending beyond said insulative tape and said covering whereby said free ends are adapted for electrical connection to external circuitry.

8. The apparatus of claim 2 wherein said coil has in the order of 12,000 turns on said strip; said coil has a resistance of 100 to 200 ohms.

* * * * *